US010528800B2

(12) United States Patent
Liu et al.

(10) Patent No.: US 10,528,800 B2
(45) Date of Patent: Jan. 7, 2020

(54) AUTOMATED FACIAL RECOGNITION DETECTION

(71) Applicant: INTERNATIONAL BUSINESS MACHINES CORPORATION, Armonk, NY (US)

(72) Inventors: Chih-Hsiung Liu, Taipei (TW); Hao-Ting Shih, Taipei (TW); Cheng-Fang Lin, New Taipei (TW); Norman Kung, Taipei (TW)

(73) Assignee: International Business Machines Corporation, Armonk, NY (US)

(*) Notice: Subject to any disclaimer, the term of this patent is extended or adjusted under 35 U.S.C. 154(b) by 179 days.

(21) Appl. No.: 15/866,694

(22) Filed: Jan. 10, 2018

(65) Prior Publication Data

US 2019/0213393 A1 Jul. 11, 2019

(51) Int. Cl.
*G06K 9/00* (2006.01)
*G06N 5/04* (2006.01)
*G06F 8/65* (2018.01)

(52) U.S. Cl.
CPC ..... *G06K 9/00288* (2013.01); *G06K 9/00248* (2013.01); *G06K 9/00268* (2013.01); *G06F 8/65* (2013.01); *G06K 9/00087* (2013.01); *G06N 5/04* (2013.01)

(58) Field of Classification Search
None
See application file for complete search history.

(56) References Cited

U.S. PATENT DOCUMENTS

| 9,811,718 | B2* | 11/2017 | Sun ................... G06K 9/00281 |
| 10,108,850 | B1* | 10/2018 | Das ................... G06K 9/00885 |
| 2015/0071557 | A1 | 3/2015 | Movellan et al. |
| 2015/0347819 | A1 | 12/2015 | Yin et al. |
| 2015/0347820 | A1 | 12/2015 | Yin et al. |

(Continued)

FOREIGN PATENT DOCUMENTS

CN 106951867 7/2017

OTHER PUBLICATIONS

Banaeeyan, Rasoul et al.; Deep or Shallow Facial Descriptors? A Case for Facial Attribute Classification and Face Retrieval; Retrieved from the Internet Sep. 2, 2017; URL: https://www.researchgate.net/publication/315160920_Deep_or_Shallow_Facial_Descriptors_A_Case_for_Facial_Attribute_Classification_and_Face_Retrieval; 3 pages.

*Primary Examiner* — Iman K Kholdebarin
(74) *Attorney, Agent, or Firm* — Schmeiser, Olsen & Watts; Mark C. Vallone

(57) ABSTRACT

A method and system for improving an automated facial recognition software system is provided. The method includes automatically detecting a face of a user via an IOT device. An image of the face is retrieved and image portions are extracted from the image and represented as a vector. The user is classified via determined facial feature attributes with respect to a plurality of user type weights stored in a cache and an initial user type of the user is determined. The vector and data indicating the initial user type are transmitted to a server and a process for inferring with respect to the initial user type, the vector, and images in a specified database associated with the initial user type, a final user type of the user s performed. An identity of the user is determined based on the inferring and the identity is transmitted to the IOT device.

20 Claims, 8 Drawing Sheets

(56) References Cited

U.S. PATENT DOCUMENTS

| | | |
|---|---|---|
| 2016/0259816 A1 | 9/2016 | Song |
| 2017/0039469 A1* | 2/2017 | Majumdar ........... G06N 3/0445 |
| 2018/0165746 A1* | 6/2018 | Huang .................... G06F 17/40 |
| 2019/0005632 A1* | 1/2019 | Huang ...................... G06T 5/50 |
| 2019/0095705 A1* | 3/2019 | Yu ...................... G06K 9/00288 |
| 2019/0102905 A1* | 4/2019 | Skogo ....................... G06T 7/73 |

* cited by examiner

AUTOMATED FACIAL RECOGNITION DETECTION

FIELD

The present invention relates generally to a method for automatically performing facial recognition detection and in particular to a method and associated system for improving facial recognition software technology associated with determining user identity and enabling associated hardware software system access.

BACKGROUND

Accurately identifying a user via mobile devices typically includes an inaccurate process with little flexibility. Determining how to enable system access with respect to Web features may include a complicated process that may be time consuming and require a large amount of resources. Accordingly, there exists a need in the art to overcome at least some of the deficiencies and limitations described herein above.

SUMMARY

A first aspect of the invention provides an automated facial recognition improvement method comprising: automatically detecting, by a processor of an Internet of things (IOT) hardware device of a user, a face of the user; automatically retrieving, by the processor, an image of the face of the user; extracting, by the processor from the image, images of major facial feature attributes of the face of the use, wherein the major facial feature attributes are represented in a vector; classifying, by the processor, the user via the facial feature attributes with respect to a plurality of user type weights stored in a cache of the IOT hardware device; determining, by the processor based on results of the classifying, an initial user type of the user; transmitting, by the processor to a server, the vector representing the facial feature attributes and data indicating the initial user type, wherein deep learning model software code is executed for inferring, via the server and with respect to the initial user type, the vector, and a plurality of images in a specified database associated with the initial user type, a final user type of the user, wherein an identity of the user is determined based on the inferring, and wherein the identity of the user is transmitted to the IOT device, and receiving, by the processor, the identity of the user.

A second aspect of the invention provides a computer program product, comprising a computer readable hardware storage device storing a computer readable program code, the computer readable program code comprising an algorithm that when executed by a processor of an IOT hardware device of a user implements an automated facial recognition improvement method, the method comprising: automatically detecting, by the processor, a face of the user; automatically retrieving, by the processor, an image of the face of the user; extracting, by the processor from the image, images of major facial feature attributes of the face of the use, wherein the major facial feature attributes are represented in a vector; classifying, by the processor, the user via the facial feature attributes with respect to a plurality of user type weights stored in a cache of the IOT hardware device; determining, by the processor based on results of the classifying, an initial user type of the user; transmitting, by the processor to a server, the vector representing the facial feature attributes and data indicating the initial user type, wherein deep learning model software code is executed for inferring, via the server and with respect to the initial user type, the vector, and a plurality of images in a specified database associated with the initial user type, a final user type of the user, wherein an identity of the user is determined based on the inferring, and wherein the identity of the user is transmitted to the IOT device, and receiving, by the processor, the identity of the user.

A third aspect of mobile hardware device provides an IOT hardware device comprising a processor coupled to a computer-readable memory unit, the memory unit comprising instructions that when executed by the processor implements an automated facial recognition improvement method comprising: automatically detecting, by the processor, a face of the user; automatically retrieving, by the processor, an image of the face of the user; extracting, by the processor from the image, images of major facial feature attributes of the face of the use, wherein the major facial feature attributes are represented in a vector; classifying, by the processor, the user via the facial feature attributes with respect to a plurality of user type weights stored in a cache of the IOT hardware device; determining, by the processor based on results of the classifying, an initial user type of the user; transmitting, by the processor to a server, the vector representing the facial feature attributes and data indicating the initial user type, wherein deep learning model software code is executed for inferring, via the server and with respect to the initial user type, the vector, and a plurality of images in a specified database associated with the initial user type, a final user type of the user, wherein an identity of the user is determined based on the inferring, and wherein the identity of the user is transmitted to the IOT device, and receiving, by the processor, the identity of the user.

The present invention advantageously provides a simple method and associated system capable of accurately identifying a user via a mobile device.

DETAILED DESCRIPTION

Figure 1:
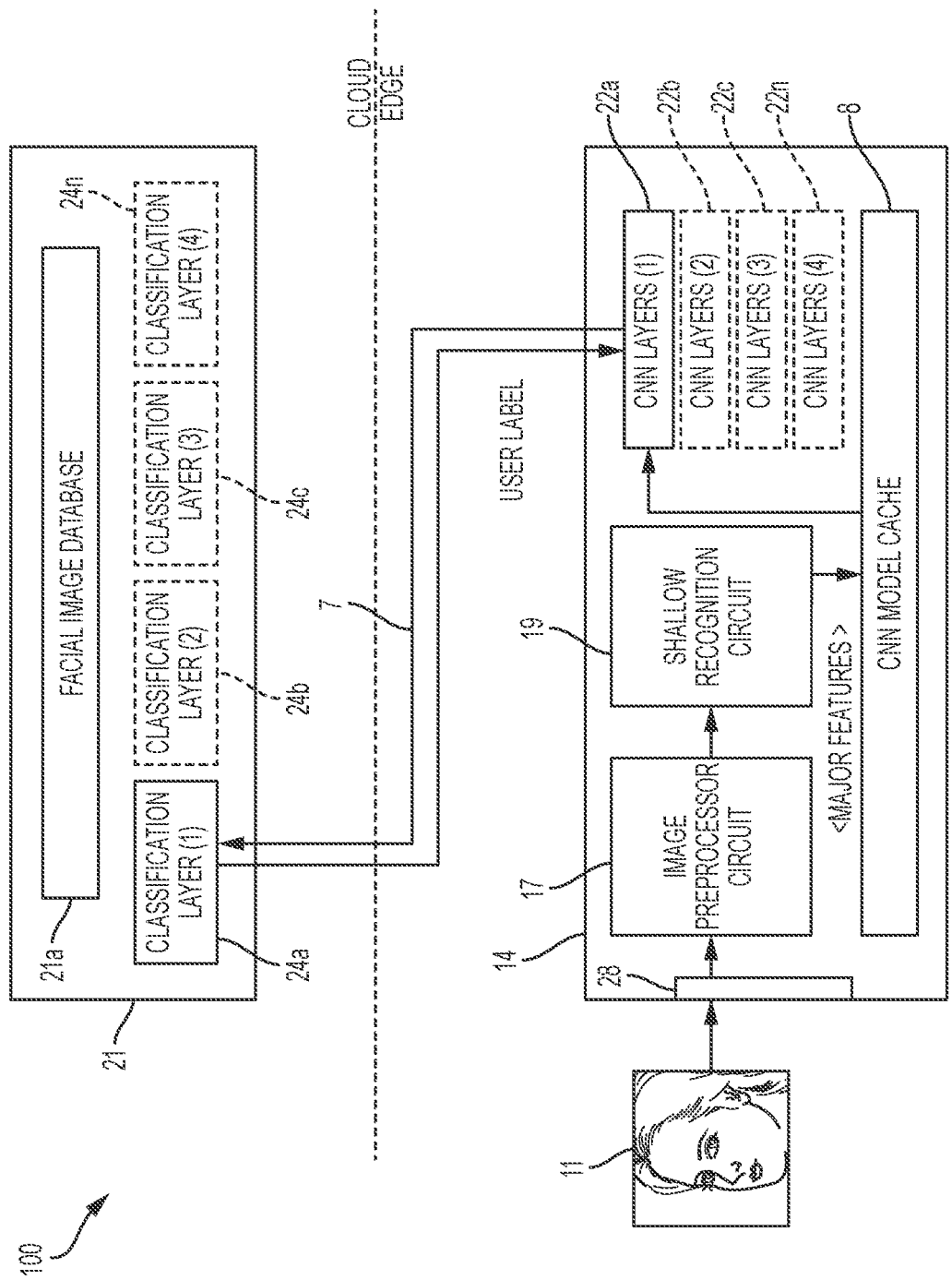
FIG. 1 illustrates a system for improving facial recognition software technology associated with determining user identity and enabling associated hardware software system access, in accordance with embodiments of the present invention.

FIG. 1 illustrates a system 100 for improving facial recognition software technology associated with determining user identity and enabling associated hardware software system access, in accordance with embodiments of the present invention. System 100 is enabled to generate a hierarchical structure for a model based on facial features being extracted. Rather than forming a single deep facial recognition process, a shallow recognition process is executed for grouping facial images into differing databases. For example, male/female, hair color, eye color, facial objects (e.g., glasses, jewelry, etc.), presence of facial hair, facial shape, etc. may be used as attributes for creating the differing databases. The attributes may be extracted via execution of a computer vision library such as, inter alia, open source computer vision library, etc. Subsequently, deep neural network architecture software (e.g., convolutional neural network (CNN) software) is executed for generating accurate database models for each database thereby reducing a size of a trained model and improving accuracy and inference efficiency with respect to database memory structure. Additionally, internal cache memory is used for storing deep facial models such that when detecting a face, system 100 executes shallow facial recognition software for extracting key attributes (as recited, supra). The key attributes are used as an index for retrieving a corresponding model trained with respect to the cloud. The deep facial models model(s) are stored within the cache subsequent model retrieval processes.

System 100 of FIG. 1 includes a server 21 connected through a network 7 to an Internet of things (IOT) hardware device 14. IOT hardware device 14 comprises sensors and circuitry/logic 28 (e.g., for sensing or retrieving a facial image 11), image preprocessor circuitry 17, shallow recognition circuitry 19, and a CNN cache memory structure 8 comprising CNN software layers 22a . . . 22n. Server 21 comprises a facial image database 21a and classification layers (software) 24a . . . 24n. CNN cache memory structure 8 and facial image database 21a each include a control software application and software code. CNN cache memory structure 8 and facial image database 21a each may include a single memory system. Alternatively, CNN cache memory structure 8 and facial image database 21a each may include a plurality of memory systems. Server 21 and IOT hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 21 and IOT hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-8. The specialized discrete non-generic analog, digital, and logic based circuitry (e.g., classification layers 24a . . . 24n, sensors and circuitry/logic 28, image preprocessor circuitry 17, shallow recognition circuitry 19, CNN layers 22a . . . 22n, etc.) may include proprietary specially designed components (e.g., a specialized integrated circuit, such as for example an Application Specific Integrated Circuit (ASIC) designed for only implementing a process for improving facial recognition software technology associated with determining user identity and enabling associated hardware software system access. Sensors and circuitry/logic 28 may include sensors including accelerometers (for determining an orientation, a pattern of movement, and a location of mobile hardware device), light detection sensors, a barometer sensor, an audio sensors; GPS sensors, optical sensors, heart rate sensors, temperature sensors, video cameras, etc. Network 7 may include any type of network including, inter alia, a local area network, (LAN), a wide area network (WAN), the Internet, a wireless network, etc.

System 100 utilizes sensors and circuitry/logic 28 to execute a combination of shallow recognition software and deep facial recognition software. The shallow recognition software is executed for identifying major attributes of a user (e.g., male/female, etc.). The deep facial recognition software is executed for detailing a facial feature extraction (e.g., hair color, eye color, facial objects (e.g., glasses, jewelry, etc.), presence of facial hair, facial shape) and classification process. System 100 executes an IoT-based facial recognition model for minimizing data transfer latency. Additionally, system 100 is enabled for converting a CNN model into hybrid cloud architecture such that feature extraction and classification is performed with respect to cloud architecture. Databases storing the attributes are weighed based on self-learning software code. The aforementioned attributes are configured to minimize a size of weights and improve self-learning software model accuracy. Pre-trained weighting values may be cached within IOT hardware device 14 such that weighting values are downloaded only when necessary.

Figure 2:
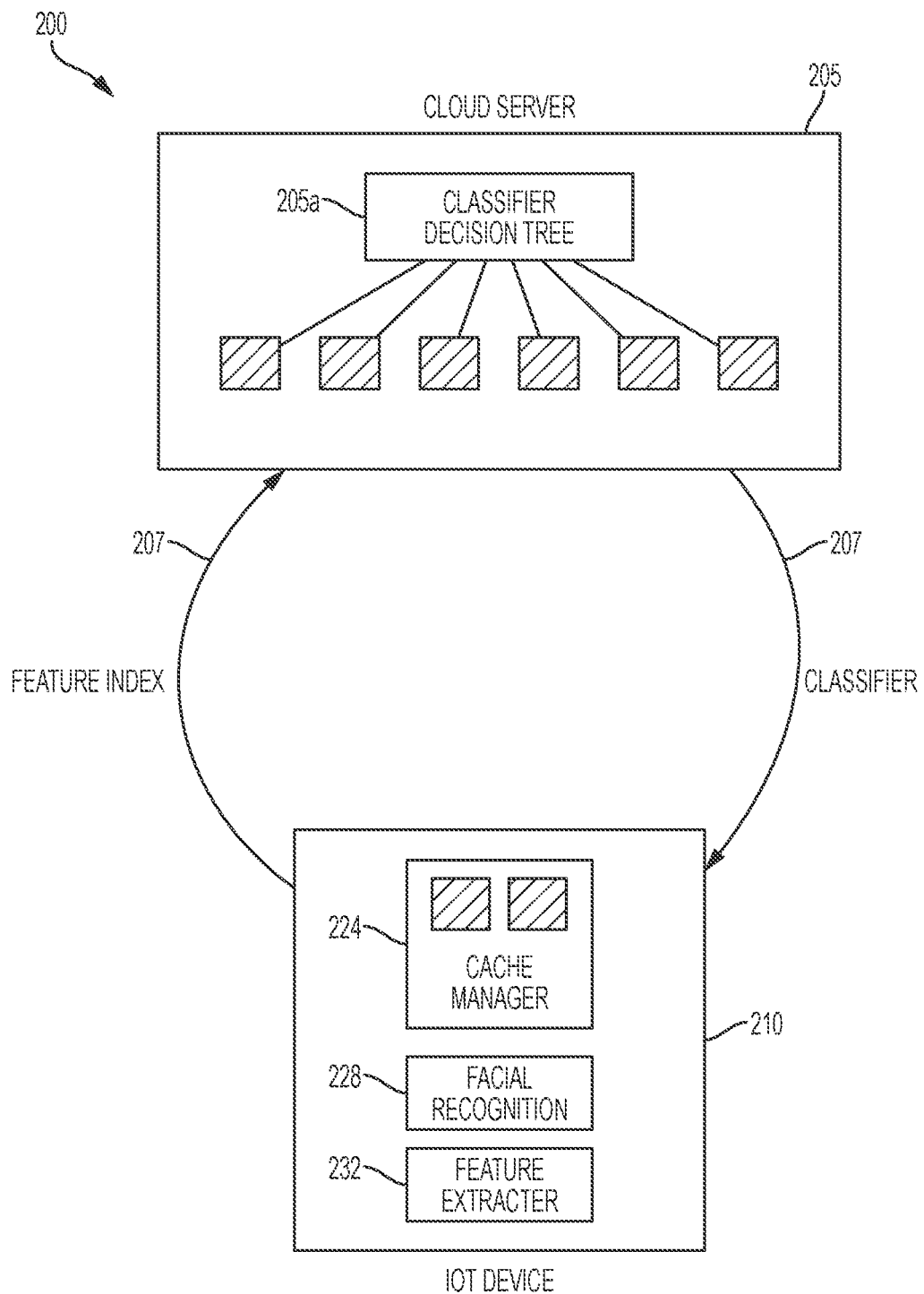
FIG. 2 illustrates an alternative system for improving facial recognition software technology associated with determining user identity and enabling associated hardware software system access, in accordance with embodiments of the present invention.

FIG. 2 illustrates an alternative system 200 for improving facial recognition software technology associated with determining user identity and enabling associated hardware software system access, in accordance with embodiments of the present invention. System 200 includes a cloud server 205 and an IOT device 210. Cloud server 205 comprises classifier decision tree software 205a for efficiently selecting an associated classifier based on execution of a facial feature index. Classifier decision tree software 205a is generated during a model software training phase. IOT device 210 comprises a cache manager circuit/software 224, a facial recognition hardware/software module 228, and feature extractor circuitry 232. Cache manager circuit 224 includes a local storage structure and associated controller within IOT device 210. Cache manager circuit 224 is configured to cache recently used attributes(s). Additionally, cache manager circuit 224 receives notifications from cloud server 205 in response to determining that at least one of the cached attributed is expired. Facial recognition hardware/software module 228 is configured to perform a deep facial recognition process via usage of attributes with respect to a feed-forward neural network (i.e., specialized software execution). The deep facial recognition process generates an output comprising a list of associated names and associated confidence levels. Feature extractor circuitry 232 executes shadow facial recognition software via usage of a machine vision library (e.g. open CV) for extracting extract key features/attributes (e.g., gender) of a face. The key features/attributes are used to generate a facial feature index used to retrieve a corresponding classifier.

Figure 3:
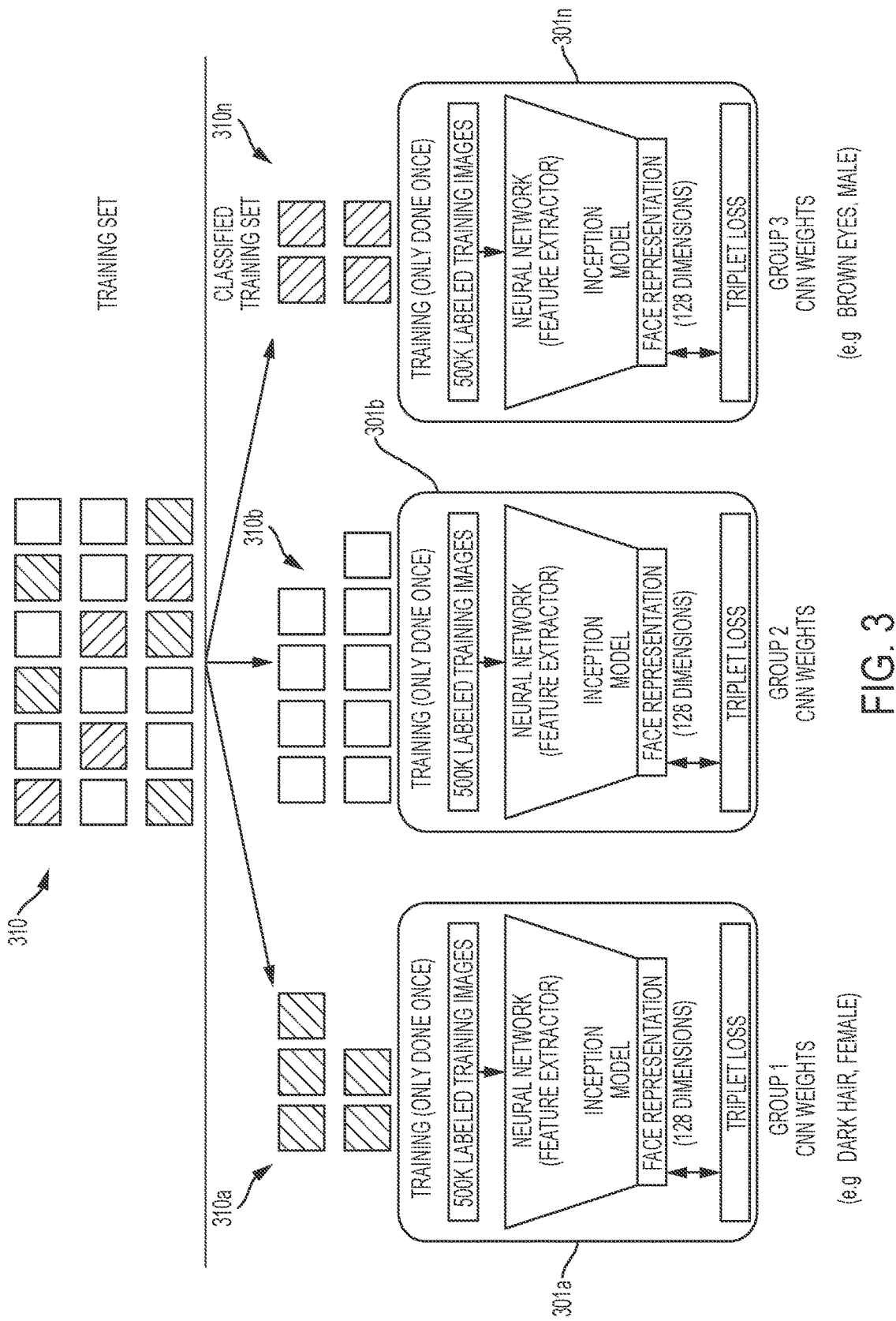
FIG. 3 illustrates a process for dividing a training set of facial attributes into a plurality of databases, in accordance with embodiments of the present invention.

FIG. 3 illustrates a process for dividing a training set of facial attributes 310 into a plurality of databases 301a . . . 301n, in accordance with embodiments of the present invention. A group of 310a is extracted (via neural network software) from training set of facial attributes 310 and placed in database 301a as a weighted set of attributes associated with dark hair and female facial attributes. A group of 310b is extracted (via neural network software) from training set of facial attributes 310 and placed in database 301b as a weighted set of attributes. A group of 310n is extracted (via neural network software) from training set of facial attributes 310 and placed in database 301n as a weighted set of attributes associated with brown eyes and male facial attributes.

Figure 4:
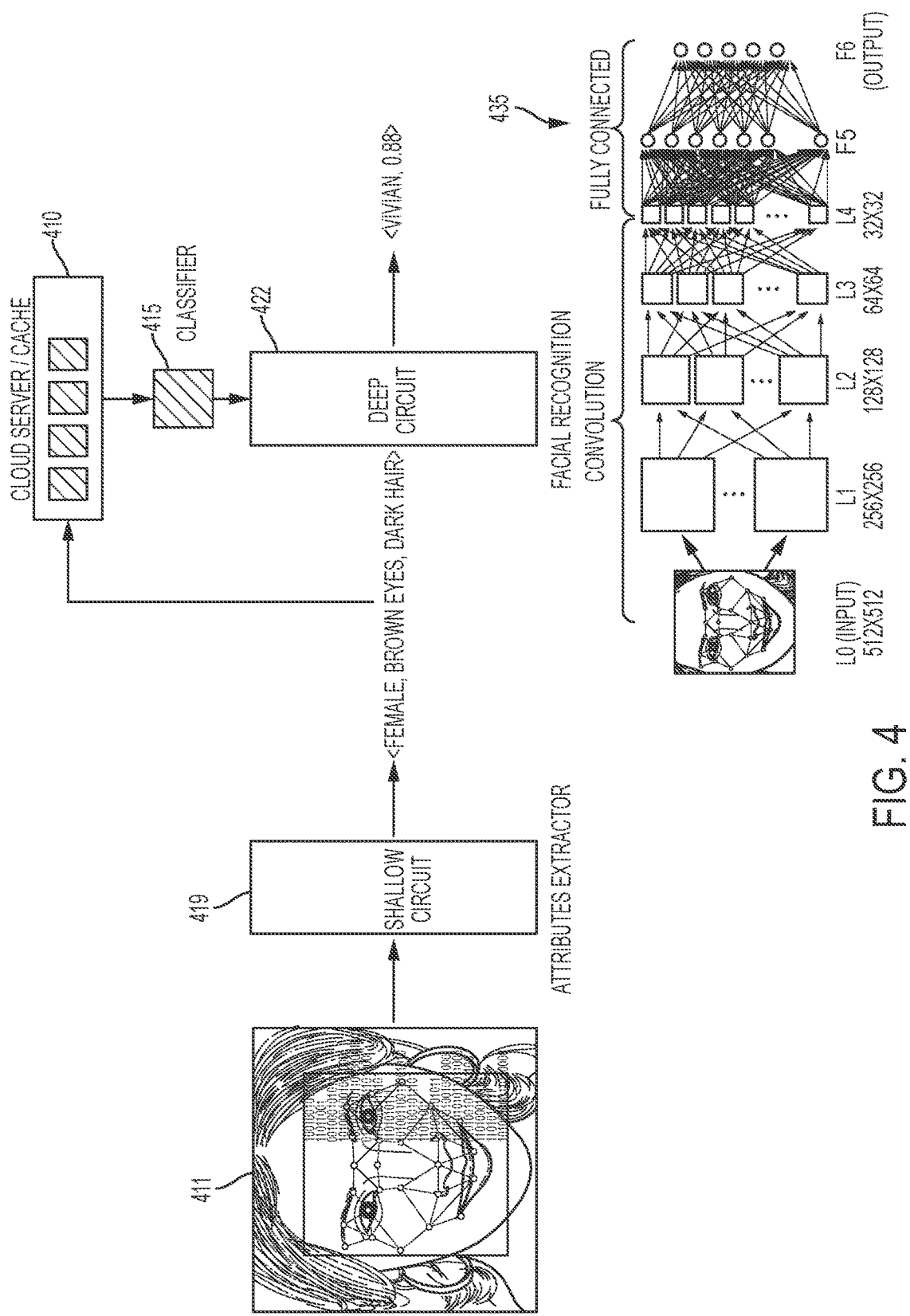
FIG. 4 illustrates a process for extracting facial attributes and determining user identity, in accordance with embodiments of the present invention.

FIG. 4 illustrates a process for extracting facial attributes and determining user identity, in accordance with embodiments of the present invention. The process illustrated in FIG. 4 executes a shallow attributes extractor circuit/software 419 with respect to a retrieved image 411 of a user. Digital information 411a is retrieved in accordance with the extracted facial attributes. The extracted facial attributes describe the user as: a female with brown eyes and dark hair. The digital information 411a describing the extracted facial attributes are stored within a cloud server/cache structure and classified by a classifier circuit 415 for execution by the deep attributes extractor circuit/software 422 performing a deep facial recognition process 435 to determine that an identity of the user is determined as being (with an 88 percent probability) Vivian.

Figure 5:
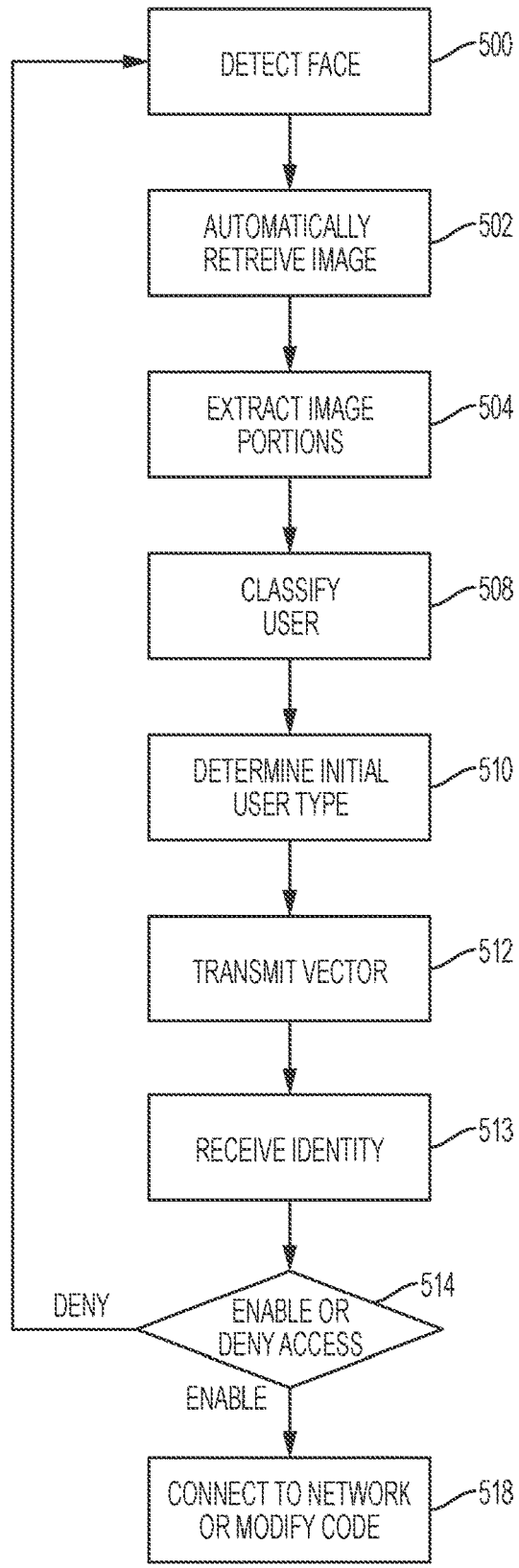
FIG. 5 illustrates an algorithm detailing a process flow enabled by the system of FIG. 1 for improving facial recognition software technology associated with determining user identity and enabling associated hardware software system access, in accordance with embodiments of the present invention.

FIG. 5 illustrates an algorithm detailing a process flow enabled by system 100 of FIG. 1 for improving facial recognition software technology associated with determining user identity and enabling associated hardware software system access, in accordance with embodiments of the present invention. Each of the steps in the algorithm of FIG. 5 may be enabled and executed in any order by a computer processor(s) executing computer code. Additionally, each of the steps in the algorithm of FIG. 5 may be enabled and executed in combination by IOT hardware device 14 and server 21 of FIG. 1. In step 500, a face of a user is automatically detected via sensors of an IOT hardware device. In step 502, an image of the face of the user is automatically retrieved. In step 504, images of major facial feature attributes of the face of the user are extracted from the image. The major facial features may include, inter alia, hair color, eye color, objects on the face of the user, presence of facial hair, facial shape, etc. The major facial features are represented as a vector. In step 508, the user is classified via the facial feature attributes with respect to a plurality of user type weights stored in a cache of the IOT hardware device. In step 510, an initial user type of the user is determined based on results of the classification. The initial user type may include, inter alia, male, female, etc. In step 512, the vector representing the facial feature attributes and data indicating the initial user type are transmitting to a serve. In response, deep learning model software code is executed for inferring (via the server and with respect to the initial user type, the vector, and a plurality of images in a specified database associated with the initial user type) a final user type of the user. Additionally, an identity of the user is determined based on the inferring and the identity of the user is transmitted to the IOT device. In step 513, the identity of the user is received by the IOT device. The identity of the user may be additionally determined by retrieving and analyzing a fingerprint image (retrieved via a fingerprint sensor) and/or RFID tag data (retrieved via an RFID tag) of the user. In step 514, access to the IOT device is enabled or denied based on the received identity of the user. If in step 514, access to the IOT device is denied, then step 500 is repeated. If in step 514, access to the IOT device is enabled then in step 518, the user may be automatically connected to a secure network. Additionally, shallow recognition software code (executed by the IOT device) and/or the deep learning model software code (of step 512) may be modified based on results of the process described with respect to FIG. 5.

Figure 6:
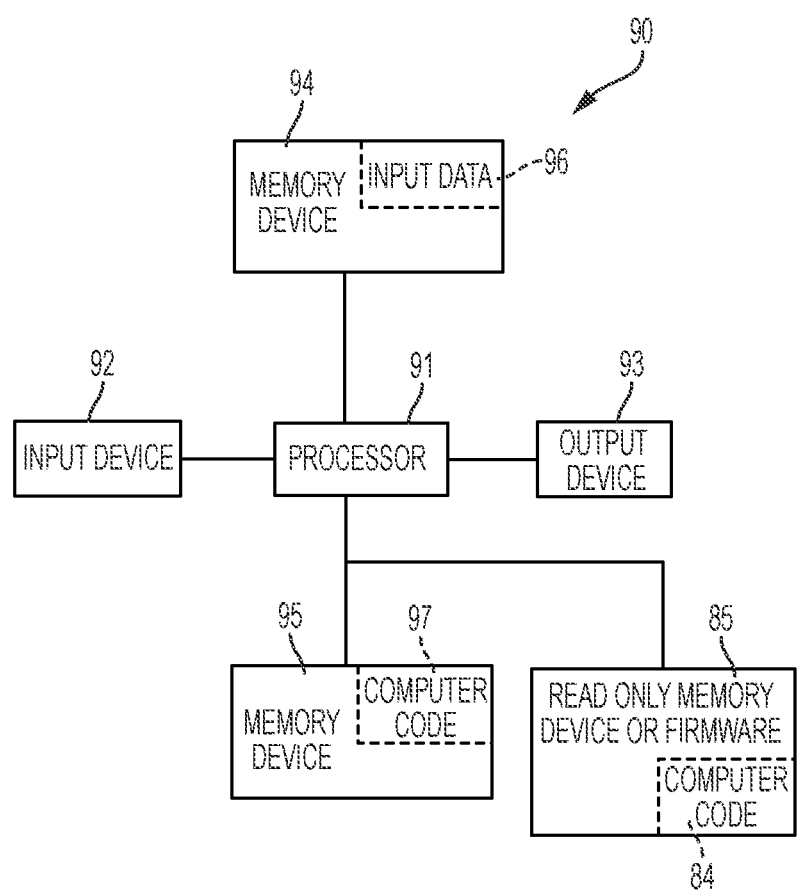
FIG. 6 illustrates a computer system used by the system of FIG. 1 for enabling a process for improving facial recognition software technology associated with determining user identity and enabling associated hardware software system access, in accordance with embodiments of the present invention.

FIG. 6 illustrates a computer system 90 (e.g., IOT hardware device 14 and server 21 of FIG. 1) used by or comprised by the system of FIG. 1 for improving facial recognition software technology associated with determining user identity and enabling associated hardware software system access, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 5) for improving facial recognition software technology associated with determining user identity and enabling associated hardware software system access. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve facial recognition software technology associated with determining user identity and enabling associated hardware software system access. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving facial recognition software technology associated with determining user identity and enabling associated hardware software system access. In another embodiment, the invention provides a business method that performs the process steps of the invention on a subscription, advertising, and/or fee basis. That is, a service supplier, such as a Solution Integrator, could offer to enable a process for improving facial recognition software technology associated with determining user identity and enabling associated hardware software system access. In this case, the service supplier can create, maintain, support, etc. a computer infrastructure that performs the process steps of the invention for one or more customers. In return, the service supplier can receive payment from the customer(s) under a subscription and/or fee agreement and/ or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
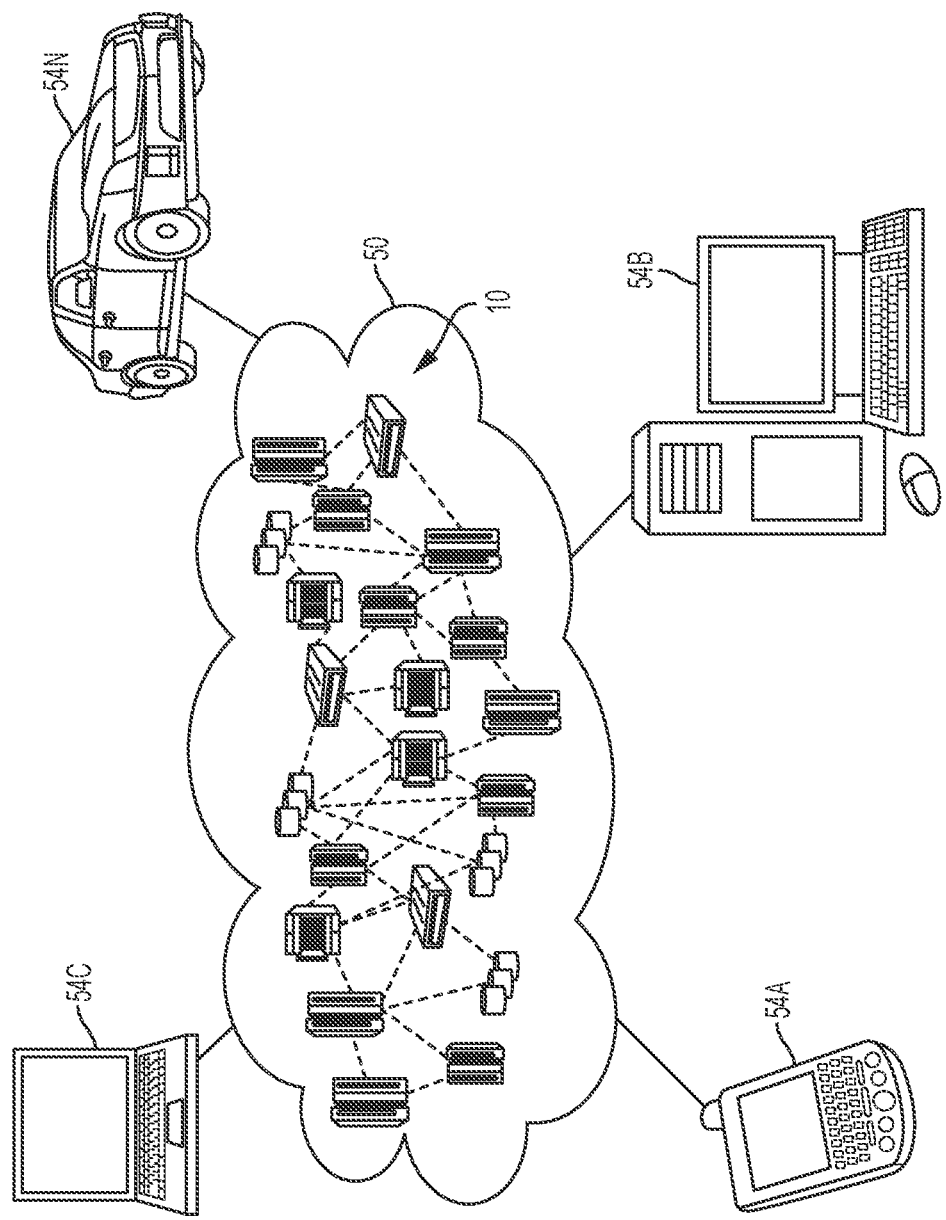
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
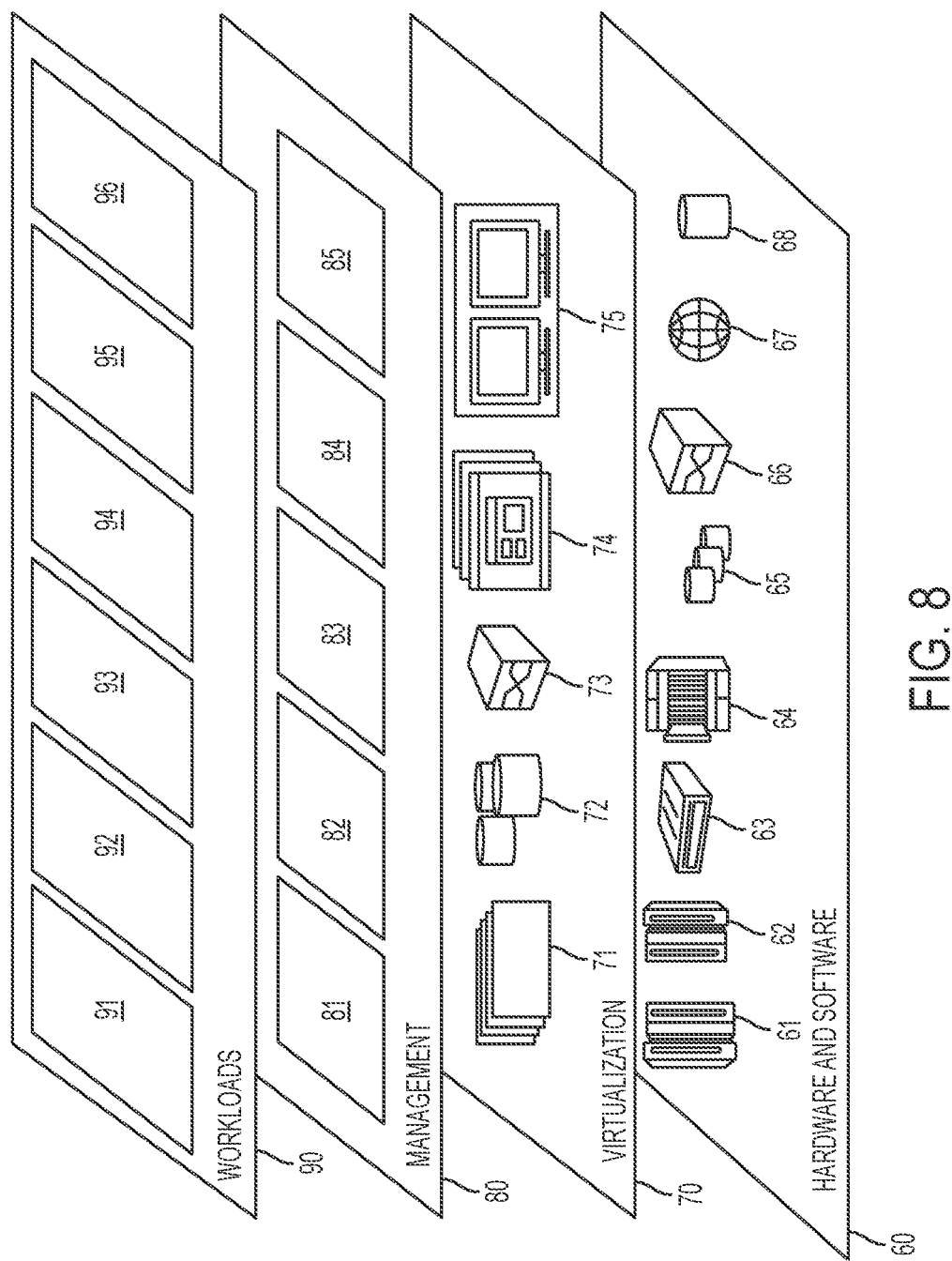
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving facial recognition software technology associated with determining user identity and enabling associated hardware software system access 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated facial recognition improvement method comprising:
    automatically detecting, by a processor of an Internet of things (IOT) hardware device of a user, a face of said user;
    automatically retrieving, by said processor, an image of said face of said user;
    extracting, by said processor from said image, images of major facial feature attributes of said face of said use, wherein said major facial feature attributes are represented in a vector;
    classifying, by said processor, said user via said facial feature attributes with respect to a plurality of user type weights stored in a cache of said IOT hardware device;
    determining, by said processor based on results of said classifying, an initial user type of said user;
    transmitting, by said processor to a server, said vector representing said facial feature attributes and data indicating said initial user type, wherein deep learning model software code is executed for inferring, via said server and with respect to said initial user type, said vector, and a plurality of images in a specified database associated with said initial user type, a final user type of said user, wherein an identity of said user is determined based on said inferring, and wherein said identity of said user is transmitted to said IOT device, and
    receiving, by said processor, said identity of said user.

2. The method of claim 1, wherein said major facial feature attributes of said user comprise attributes selected from the group consisting of hair color, eye color, objects on said face of said user, presence of facial hair, and facial shape.

3. The method of claim 1, wherein said user type of said user comprises a male or a female.

4. The method of claim 1, further comprising:
    enabling, by said processor based on said identity of said user, secure user access to said IOT hardware device.

5. The method of claim 1, further comprising:
    denying, by said processor based on said identity of said user, user access to said IOT hardware device.

6. The method of claim 1, further comprising:
    automatically connecting, by said processor based on said identity of said user, said IOT hardware device to a secure network.

7. The method of claim 1, further comprising:
    modifying, by said processor based on results of said extracting and said classifying, shallow recognition software code executed by said IOT device.

8. The method of claim 1, further comprising:
    modifying, by said processor based on results of said inferring, said deep learning model software code.

9. The method of claim 1, further comprising:
    retrieving, by said processor via a fingerprint sensor of said IOT hardware device, a fingerprint image of said user, wherein said identity of said user in further determined on said fingerprint image of said user.

10. The method of claim 1, further comprising:
    scanning, by said processor via an RFID tag reader of said IOT hardware device, an RFID tag of said user, wherein said identity of said user in further determined based on said data retrieved from said RFID tag of said user.

11. The method of claim 1, further comprising:
providing at least one support service for at least one of creating, integrating, hosting, maintaining, and deploying computer-readable code in the control hardware, said code being executed by the computer processor to implement: said automatically detecting, said automatically retrieving, said extracting, said classifying, said determining, said transmitting, and said receiving.

12. A computer program product, comprising a computer readable hardware storage device storing a computer readable program code, said computer readable program code comprising an algorithm that when executed by a processor of an IOT hardware device of a user implements an automated facial recognition improvement method, said method comprising:
automatically detecting, by said processor, a face of said user;
automatically retrieving, by said processor, an image of said face of said user;
extracting, by said processor from said image, images of major facial feature attributes of said face of said use, wherein said major facial feature attributes are represented in a vector;
classifying, by said processor, said user via said facial feature attributes with respect to a plurality of user type weights stored in a cache of said IOT hardware device;
determining, by said processor based on results of said classifying, an initial user type of said user;
transmitting, by said processor to a server, said vector representing said facial feature attributes and data indicating said initial user type, wherein deep learning model software code is executed for inferring, via said server and with respect to said initial user type, said vector, and a plurality of images in a specified database associated with said initial user type, a final user type of said user, wherein an identity of said user is determined based on said inferring, and wherein said identity of said user is transmitted to said IOT device, and
receiving, by said processor, said identity of said user.

13. The computer program product of claim 12, wherein said major facial feature attributes of said user comprise attributes selected from the group consisting of hair color, eye color, objects on said face of said user, presence of facial hair, and facial shape.

14. The computer program product of claim 12, wherein said user type of said user comprises a male or a female.

15. The computer program product of claim 12, wherein said method further comprises:

enabling, by said processor based on said identity of said user, secure user access to said IOT hardware device.

16. The computer program product of claim 12, wherein said method further comprises:
denying, by said processor based on said identity of said user, user access to said IOT hardware device.

17. The computer program product of claim 12, wherein said method further comprises:
automatically connecting, by said processor based on said identity of said user, said IOT hardware device to a secure network.

18. The computer program product of claim 12, wherein said method further comprises:
modifying, by said processor based on results of said extracting and said classifying, shallow recognition software code executed by said IOT device.

19. The computer program product of claim 12, wherein said method further comprises:
modifying, by said processor based on results of said inferring, said deep learning model software code.

20. An IOT hardware device comprising a processor coupled to a computer-readable memory unit, said memory unit comprising instructions that when executed by the processor implements an automated facial recognition improvement method comprising:
automatically detecting, by said processor, a face of said user;
automatically retrieving, by said processor, an image of said face of said user;
extracting, by said processor from said image, images of major facial feature attributes of said face of said use, wherein said major facial feature attributes are represented in a vector;
classifying, by said processor, said user via said facial feature attributes with respect to a plurality of user type weights stored in a cache of said IOT hardware device;
determining, by said processor based on results of said classifying, an initial user type of said user;
transmitting, by said processor to a server, said vector representing said facial feature attributes and data indicating said initial user type, wherein deep learning model software code is executed for inferring, via said server and with respect to said initial user type, said vector, and a plurality of images in a specified database associated with said initial user type, a final user type of said user, wherein an identity of said user is determined based on said inferring, and wherein said identity of said user is transmitted to said IOT device, and
receiving, by said processor, said identity of said user.

* * * * *